United States Patent

Nemphos et al.

[11] Patent Number: 5,300,576
[45] Date of Patent: Apr. 5, 1994

[54] HIGHER HEAT DEGRADABLE POLYMER ALLOYS

[75] Inventors: Speros P. Nemphos, Clinton; Gregory B. Kharas, Chelmsford, both of Mass.

[73] Assignee: Camelot Technologies, Inc., Leominster, Mass.

[21] Appl. No.: 770,320

[22] Filed: Oct. 3, 1991

[51] Int. Cl.$^5$ ............... C08L 67/04; C08G 63/08
[52] U.S. Cl. .................... 525/190; 525/55; 525/56; 525/100; 525/102; 525/397; 525/419; 525/421; 525/422; 525/425; 525/429; 525/431; 525/450; 525/451; 525/454; 525/455; 528/354
[58] Field of Search ............ 525/55, 56, 100, 102, 525/190, 421, 422, 419, 425, 429, 431, 451, 454, 455, 450, 397; 528/354

[56] References Cited

U.S. PATENT DOCUMENTS 3,336,267 8/1967 Zimmerman et al.
4,246,374 1/1981 Kopchik.
4,477,654 10/1984 Holmes et al.
4,569,969 2/1986 Jones et al.
4,631,311 12/1986 Wingler et al.
5,061,281 10/1991 Mares et al. .................. 523/113
5,066,772 11/1991 Tang et al. .................... 528/354

FOREIGN PATENT DOCUMENTS 9001521 2/1990 PCT Int'l Appl.

*Primary Examiner*—John Kight, III
*Assistant Examiner*—John M. Cooney. Jr.
*Attorney, Agent, or Firm*—Stevens, Davis, Miller & Mosher

[57] ABSTRACT

The thermal properties, such as heat distortion temperature of biodegradable polymers, such as polylactic acid, polyglycolides, polybutyric acid and copolymers of butyric and valeric acid, may be increased by blending them with a polymer having Tg from 75° C. to 200° C. and a Hildebrand parameter ($\sigma$) of not more than 3 MPA$^{\frac{1}{2}}$ different from the biopolymer.

10 Claims, No Drawings

HIGHER HEAT DEGRADABLE POLYMER ALLOYS

FIELD OF THE INVENTION

The present invention relates to biodegradable polymer alloys. More particularly the present invention relates to biodegradable polymer alloys having a Tg of greater than about 60, preferably greater than about 65° C.

BACKGROUND OF THE INVENTION

Currently, there is an increasing interest in truly biodegradable polymers. Biodegradable polymers have been used in medical and pharmaceutical applications for a number of years in applications such as absorbable sutures and controlled release of clinical drugs. There have been some attempts to use such polymers in commodity polymer applications such as packaging, film wrap and food applications. Unfortunately, many of these types of polymers have a relatively low glass transition temperature (or Tg) and a relatively low heat distortion temperature. Such a low heat distortion temperature makes the polymers per se unsuitable for use in applications where the polymer will be exposed to moderate to high temperatures such as the boiling temperature of water (e.g. hot drink containers such as coffee and tea cups and microwave containers).

There are several types of biodegradable polymers which may be competing in the same application fields or they may be complementary. The polylactides or homopolymers of lactic acid are one type of degradable polymer. Polyhydroxy alkanoates (PHA) are another type of biodegradable polymer. The polyhydroxy alkanoates may be represented by homopolymers of 3-hydroxy butyrate (sometimes also referred to as PHB) or copolymers with 3- or 4-hydroxy valerate (sometimes called PHBV).

PCT Patent Application WO 90/01521 filed Aug. 4, 1989 in the name of Battelle Memorial Institute contains a good description of the prior art in the field of homopolymers of lactic acid. The patent application discusses a number of applications of polylactic acid. In the disclosure of the third general embodiment beginning at page 65 of the patent application, there is a discussion of various blends of polylactic acid with other polymers. The other polymers include polystyrene, polyethylene, polyethylene terephthalate and polypropylene. In the disclosure of WO 90/01521 at page 74, there is an additional list of monomers which may be polymerized to form polymers which may be blended with polylactic acid. The monomers include styrene, ethylene, propylene, vinyl chloride, vinyl acetate, alkyl methacrylates, alkyl acrylates and physical mixtures thereof.

The patent application does not address the issue of the Tg of polylactic acid. Furthermore, the patent application does not suggest alloys of polylactic acid with polycarbonate, imidized acrylates and polymers containing anhydrides of ethylenically unsaturated dicarboxylic acids. Additionally, the patent application does not contemplate all of the copolymeric biodegradable polymers of the present invention.

U.S. Pat. No. 4,477,654 issued Oct. 16, 1984, assigned to Imperial Chemical Industries PLC discloses copolymers of various hydroxy alkanoates. The patent, however, does not contemplate the formation of alloys of such polymers with the polymers of the present invention.

U.S. Pat. No. 4,246,374 issued Jan. 20, 1981, assigned to Rohm and Hass Company discloses the imidized type of polymers which may be used in the present invention. However, the patent does not disclose or suggest that such polymers could be alloyed or blended with the biodegradable polymers of the present invention.

Polymers of a vinyl aromatic compound such as styrene and anhydrides of ethylenically unsaturated dicarboxylic acids which may optionally contain (meth)acrylic esters have been known as illustrated by U.S. Pat. No. 3,336,267 now expired and U.S. Pat. No. 4,569,969 issued Feb. 11, 1986, assigned to Monsanto. Investigations relating to the use of such polymers in blends have continued as represented by U.S. Pat. No. 4,631,311 issued Dec. 23, 1986, assigned to BASF. However, none of the art located by the applicants discloses or suggests blending such polymers with biodegradable polymers of the type of the present invention.

There is a need to provide an alloy comprising a biodegradable polymer which has a higher Tg, heat distortion temperature and/or a higher melting temperature. The present invention seeks to provide such a polymer alloy or blend.

SUMMARY OF THE INVENTION

The present invention provides a polymer alloy having a Tg of not less than 62° C. comprising:
(i) from 50 to 75 weight % of one or more polymers having a molecular weight of greater than 40,000 comprising the residues of one or more monomers of the formula

$$-OCR_1R_2(CR_3R_4)_nCO-\qquad\text{I}$$

and

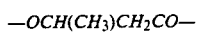

$$-OCH(CH_3)CH_2CO-\qquad\text{II}$$

wherein in Formula I $R_1$, $R_2$, $R_3$, and $R_4$ are independently selected from the group consisting of a hydrogen atom and a $C_{1-4}$ alkyl radical and n is 0 or an integer from 1 to 5, provided that when n is 1 and $R_2$, $R_3$, and $R_4$ are hydrogen, $R_1$ can not be a methyl radical; and
(ii) from 50 to 25 weight % of one or more polymers having a Tg from 75° C. to 200° C. and a difference in the range of Hildebrand parameters ($\sigma$) from those for the polymers of component (i) of not more than 3MPA$^{\frac{1}{2}}$.

DETAILED DESCRIPTION

The polymer alloys or blends of the present invention have a Tg of not less than about 62, preferably greater than about 65 most preferably from about 65 to 75° C. The Tg of a polymer blend or alloy is that temperature at which the polymer blend or alloy changes from a more crystalline blend or alloy to a less crystalline blend or alloy. This change may be measured using differential scanning calorimetry. The melting temperature of a polymer blend or alloy may also be measured using the previously noted techniques. The heat distortion temperature of a polymer blend or alloy may be measured using conventional techniques such as the procedure set forth in ASTM test D648.

The biodegradable polymers which may be used in accordance with the present invention should have a molecular weight of at least 40,000, more preferably of at least 60,000 most preferably in the range from 80,000 to 100,000 or greater.

Generally, the biodegradable polymers of the present invention will be co- or homopolymers of lactides, glycolides and hydroxy alkanoates. The lactides are prepared by the polymerization of lactic acid or the ring opening polymerization, typically in the presence of a catalysts such as stannous octoate, of the dimer of lactic acid (lactide). The glycolides are known in the field. The polyhydroxy alkanoates are polymers of monomers which contain both a carboxy radical and an additional hydroxy radical. Representative of such polymers are polyhydroxy butyrate, a polymer of 3-hydroxy butanoic acid (PHB) or a copolymer of 3-hydroxy butanoic acid and 4-hydroxy valeric acid (sometimes called PHBV).

The polylactides may be prepared using classical chemistry. Polyhydroxy alkanoates are generally produced using biosynthesis or fermentation technology as noted above.

In Formula I, if n is 0 and one of $R_1$ and $R_2$ is a methyl radical and the other is hydrogen the monomer is lactic acid. If the polymer is a homopolymer then it is polylactic acid.

In Formula I, if n is 0 and both of $R_1$ and $R_2$ are hydrogen then the monomer residue is that of glycolic acid.

If in Formula I, n is 1 and one of $R_1$ and $R_2$ is a hydrogen atom and the other is a methyl radical and $R_3$ and $R_4$ are hydrogen atoms then the monomer is 3-hydroxy butanoic acid and the polymer is PHA.

If in Formula I, n and $R_1$, $R_2$, $R_3$, and $R_4$ are as defined above then Formula I and II are the same. If in Formula I, n is 1 and each of $R_3$ and $R_4$ are hydrogen and one of $R_1$ and $R_2$ is hydrogen and the other is ethyl radical then the monomer residue is that of 3-hydroxy valeric acid and the polymer is PHBV.

Preferably, if the biodegradable polymer is PHBV the mole ratio of monomer residues of Formula I to those of Formula II is from 99.9:0.1 to 60:40, most preferably from 5:5 to 70:30.

In the blends or alloys of the present invention the biodegradable polymer may be present in an amount from 50 to 75 preferably from 55 to 70 weight % and the other polymer may be present in an amount from 50 to 25 preferably from 45 to 30 weight %.

Component (ii) of the present invention comprises one or more polymers having Tg from 75° C. to 200° C. preferably greater than 95° C. to 150° C. which are compatible with the one or more polymers of component (i). Generally, polymers will be compatible if they have a difference in Hildebrand parameters ($\sigma$) of not more than 3, preferably not more than 2 MPA$^{\frac{1}{2}}$. The text Handbook of Solubility Parameters and other Cohesion Parameters by Allan F. M. Barton, published by CRC Press Inc., Boca Raton, Florida, 1983 contains a good discussion of Hildebrand parameters and their usefulness relative to polymer blends (particularly pages 413-417).

Useful polymers as component (ii) in the blends of the present invention are those compatible with the polymers of component (i) and which have a Tg from 75 to 200, preferably from 95° C. to 150° C.

Suitable polymers may be selected from the group consisting of:

(a) polycarbonates;

(b) polymers comprising: from 45 to 95 weight % of one or more $C_{8-12}$ vinyl aromatic monomers which are unsubstituted or substituted by a $C_{1-4}$ alkyl radical; $C_{1-6}$ alkyl or hydroxy alkyl acrylates or methacrylates; from 5 to 35 weight % of an anhydride of a $C_{4-6}$ ethylencially unsaturated dicarboxylic acid; from 0 to 50 weight % of one or more $C_{1-6}$ alkyl or hydroxy alkyl acrylates or methacrylates;

(c) polymers comprising: from 100 to 50 weight % of one or more $C_{1-6}$ alkyl or hydroxy alkyl acrylates or methacrylates; from 0 to 50 weight % of one or more $C_{8-12}$ vinyl aromatic monomers which are unsubstituted or substituted by a $C_{1-4}$ alkyl radical which polymers have been imidized to at least 10%;

(d) polymers of amides of $C_{3-6}$ ethylenically unsaturated carboxylic acids;

(e) poly phenylene ethers (also called polyphenylene oxides);

(f) polysulphones;

(g) polysiloxaines; and (h) polyimines.

The biodegradable polymer may be blended with a polycarbonate. The polycarbonate may be based on one or more polyphenols selected from the group consisting of hydroquinone, resorcinol and polyphenols of the formula

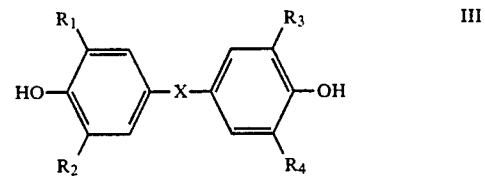

wherein $R_1$, $R_2$, $R_3$ and $R_4$ are independently selected from the group consisting of a hydrogen atom, a chlorine atom, a bromine atom and a $C_{1-4}$ alkyl radical; and X is a bond or divalent radical selected from the group consisting of $C_{1-10}$ alkylene radicals, $C_{2-8}$ alkenylene radicals and $C_{6-8}$ cycloalkylene radicals.

Preferably, the polycarbonate is based on a diphenol selected from the group consisting of 4,4' dihydroxydiphenyl; 2,2-bis-(4-hydroxyphenyl) propane; 2,4-bis-(4-hydroxyphenyl)-2-methylbutane; 1,1-bis(4-hydroxyphenyl)-cyclohexane; $\beta,\beta$-bis-(4-hydroxyphenyl)-p-diisopropylbenzene; 2,2-bis-(3-chloro-4-hydroxyphenyl)propane; 2,2-bis-(3,5-dichloro-4-hydroxyphenyl)propane.

The biodegradable polymer may be blended with a polymer comprising: from 40 to 95 weight % of one or more $C_{8-12}$ vinyl aromatic monomers which are unsubstituted or substituted by a $C_{1-4}$ alkyl radical; $C_{1-6}$ alkyl or hydroxy alkyl acrylates or methacrylates; from 5 to 40 weight % of an anhydride of a $C_{4-6}$ ethylencially unsaturated dicarboxylic acid; from 0 to 50 weight % of one or more $C_{1-6}$ alkyl or hydroxy alkyl acrylates or methacrylates.

Preferably, the vinyl aromatic monomer may be present in the polymer in an amount from 40 to 80 weight %. The anhydride may be present in the polymer in an amount from 5 to 35 weight % and the acrylate or methacrylate may be present in the polymer in an amount from 2 to 30 weight %.

In the above non-biodegradable polymer the aromatic monomer may selected from the group consisting of styrene, $\alpha$-methyl styrene and t-butyl styrene; the anhydride may maleic anhydride; and the $C_{1-4}$ alkyl or hydroxy alkyl acrylate or methacrylate may be selected from the group consisting of methyl acrylate, ethyl acrylate, methyl methacrylate and methyl methacrylate.

The biodegradable polymer may be blended with an imide. The imide may comprise: from 100 to 50 weight % of one or more $C_{1-6}$ alkyl or hydroxy alkyl acrylates or methacrylates; from 0 to 50 weight % of one or more $C_{8-12}$ vinyl aromatic monomers which are unsubstituted or substituted by a $C_{1-4}$ alkyl radical which polymers have been imidized to at least 10%.

Preferably, the polymer will have been imidized to from 10 to 95%, most preferably from about 50 to 95%, most preferably from 65 to 95%. A process for preparing such polymers is disclosed in U.S. Pat. No. 4,246,374 issued Jan. 20, 1981, assigned to Rohm and Hass Company.

Preferably, the polymer may comprise from 100 to 70 weight % of (meth)acrylate monomers and from 0 to 30 weight of vinyl aromatic monomers.

In the above non-biodegradable polymers the $C_{1-4}$ alkyl or hydroxy alkyl acrylate or methacrylate may be selected from the group consisting of methyl acrylate, ethyl acrylate, methyl methacrylate and methyl methacrylate and the vinyl aromatic monomer may be selected from the group consisting of styrene, α-methyl styrene and t-butyl styrene.

The biodegradable polymer may be blended with polymers of amides $C_{3-6}$ ethylenically unsaturated carboxylic acids. Acrylamide and methacrylamide and co- and homo-polymers thereof are suitable for use in accordance with the present invention.

The biodegradable polymer may be blended with a polyphenylene ether (also called oxides). Generally, polyphenylene ether are polymers having a backbone containing recurring monomer units of the formula

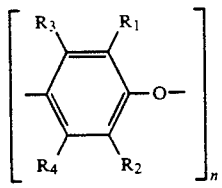

wherein $R_1$, $R_2$, $R_3$, and $R_4$ are independently selected from the group consisting of a hydrogen atom, a halogen atom, preferable chlorine or bromine, an alkyl radical, preferably containing less than 10, most preferably containing from 1 to 4 carbon atoms, and a $C_{6-10}$ aromatic radical which is unsubstituted or substituted by an alkyl radical, preferably containing less than 10, most preferably containing from 1 to 4 carbon atoms; and n is an integer from 300 to 700. The polymer may contain other monomeric units; that is, it need not be a homopolymer of only one 1,4 phenylene oxide monomer. For example, the polymer could be poly [oxy-2-acetoxytrinethyleneoxy -1,4-phenylenemethyl (phenyl) methylene -1,4-phenylene], having Tg of 110° C.

The biodegradable polymer may be blended with a polysulphone. Generally, polysulphones comprise a backbone of one or more recurring units selected from the group consisting of:

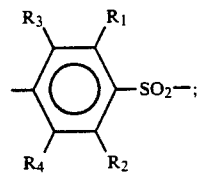

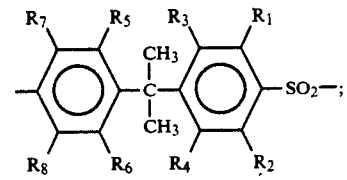

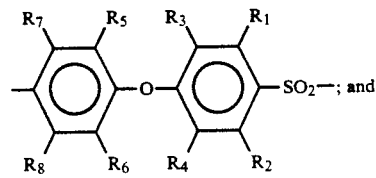

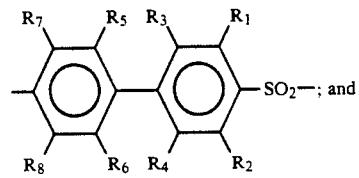

wherein $R_1$, $R_2$, $R_3$, $R_4$, $R_5$, $R_6$, $R_7$, and $R_8$ are independently selected from the group consisting of a hydrogen atom, a halogen atom, preferably chlorine or bromil, or alkyl radical, preferably containing less than 10, most preferably containing from 1 to 4 carbon atoms and a $C_{6-10}$ aromatic radical which is unsubstituted or substituted by an alkyl radical preferably containing less than 10, most preferably containing from 1 to 4 carbon atoms.

The biodegradable polymer may be blended with a polysiloxane. Typically, polysiloxones contain a backbone of recurring units of the formula:

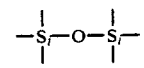

A suitable siloxane is poly [oxy (methyl) phenysilyleneoxy -1,4 -phenylene](Tg 95° C.).

The biodegradable polymer may be blended with an imine. Typically, imines contain the functional group

—NH—

The imines are cyclic compounds and may be considered nitrogen homologues of epoxides. A suitable imine is poly (benzoyliminoethylene) (Tg 105).

The above alloys may be prepared by tumble blending the polymers in the required weight ratio to produce the alloy. In the alternative, if the monomers of the biodegradable polymer and the second polymer are compatible, the second polymer may be dissolved in the monomers for the biodegradable polymer, and the biodegradable polymer subsequently polymerized. This has been effective for blends of the biodegradable polymer on polycarbonate, and the imides of acrylic acid polymers. The resulting polymer may then be extruded and chopped into pellets. If the blend is prepared by dry blending, the dry blend may then be extruded as strands which are then chopped into pellets. The operation conditions for the extruder are well known to those skilled in the art and may be determined by non-inventive testing. Typically, the extruder will be operated at temperatures from about 170° C. to 260° C. and at a screw speed of from about 80 to 150 RPM's.

The compositions per se or the resulting pellets may be further blended with up to about 30, preferably less than 15 weight % of one or more conventional additives, excluding fillers, such as heat and light stabilizers and antioxidants. The fillers and stiffening agents may also be incorporated into the compositions of the present invention in amounts up to about 50 weight %, preferably from about 20 to 40 weight %. These agents may be particulate or fibres.

The resulting pellets may be injection molded or thermoformed to produce various articles such as sheets and containers.

The present invention will now be illustrated by the following non limiting examples in which unless other wise indicated parts are parts by weight and % is weight %.

EXAMPLE 1

A copolymer comprising 80 weight % L-lactic acid and 20 weight % D-lactic acid was polymerized in the presence of stannous octoate. The resulting polymer was devolatilized to a residual monomer content of 0.5–1.0%. This polymer is referred to in this specification an Table 1 as BP 1002.

The polylactic acid (PLA) was then blended with various polymers. The polymer alloys were blended in the weigh ratio and under the conditions indicated in Table 1. The resulting alloys were injection molded into samples and tested to determine their VICAT softening temperature. This temperature is also indicated in Table 1.

TABLE 1

| POLYMER (X) | PLA/X RATIO | CONDITIONS T, °C. | RPM | VICAT °C. |
| --- | --- | --- | --- | --- |
|  | 100/0 |  |  |  |
| KAMAX 240 | 70/30 | 210–230 | 80 | 79 |
|  | 85/15 | 210–230 | 80 | 59 |
| LEXAN | 70/30 | 220–260 | 80 | 82 |

In Table 1, KAMAX (trademark) is an imidized polymethyl methacrylate produced by Rohm and Haas Company. LEXAN (trademark) is a polycarbonate produced by General Electric.

PLA has a Hildebrand parameter from 17–27 MPA$^{\frac{1}{2}}$ polycarbonate has a Hildebrand parameter of 20 MPA$^{\frac{1}{2}}$ and the imidized polymethyl methacrylate has a Hildebrand parameter from 20 to 30 MPA$^{\frac{1}{2}}$.

Table 1 shows that the Vicat softening temperature is increased only when from about 30 to 50 weight % of the non-biodegradable polymer is present.

What is claimed is:

1. A polymer alloy having a Tg of not less than 62° C. comprising:
   (i) from 50 to 75 weight % of one or more polymers having a molecular weight from 60,000 to 100,000 comprising repeating units of the formula:

$$-OCR^1R^2(CR^3R^4)_nCO-$$   I and $$-OCH(CH_3)CH_2CO-$$   II wherein Formula 1, $R_1$, $R_2$, $R_3$, and $R_4$ are independently selected from the group consisting of a hydrogen atom and a $C_{1-4}$ alkyl radical, and n is 0 or an integer from 1 to 5, provided that when n is 1 and $R_2$, $R_3$, and $R_4$ are hydrogen, $R_1$ can not be a methyl radical; and
   (ii) from 50 to 25 weight % of one or more polymers having a Tg from 75° C. to 175° C. and a difference in the range of Hildebrand parameters ($\sigma$) from those of for the polymers of component (i) of not more than 2 MPA$^{\frac{1}{2}}$ selected from the group of polymers consisting of:
   (a) polycarbonates;
   (b) polymers comprising:
      (i) from 40 to 95 weight % of one or more $C_{8-12}$ vinyl aromatic monomers which are unsubstituted or substituted by a $C_{1-4}$ alkyl radical;
      (ii) from 5 to 40 weight % of an anhydride of a $C_{4-6}$ ethylenically unsaturated dicarboxylic acid; and
      (iii) from 0 to 50 weight % of one or more $C_{1-4}$ alkyl or hydroxy alkyl acrylates or methacrylates; and
   (c) acrylate polymers comprising:
      (i) from 100 to 50 weight % of one or more $C_{1-6}$ alkyl or hydroxy alkyl acrylates or methacrylates; and
      (ii) from 0 to 50 weight % of one or more $C_{8-12}$ vinyl aromatic monomers which are unsubstituted or substituted by a $C_{1-4}$ alkyl radical,
   which acrylate polymers have been imidized to from 10% to 95%.

2. The polymer alloy according to claim 1, wherein component (i) is present in an amount from 50 to 70 weight % and component (ii) is present in amount from 50 to 30 weight %.

3. The polymer alloy according to claim 2, wherein said polycarbonate is based on one or more poly phenols selected from the group consisting of hydroquinone, resorcinol and polyphenols of the formula

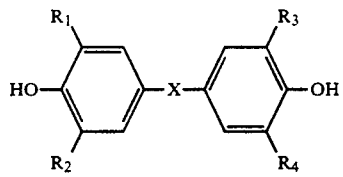

III wherein $R_1$, $R_2$, $R_3$, and $R_4$ are independently selected from the group consisting of a hydrogen atom, a chlorine atom, a bromine atom, and a $C_{1-4}$ alkyl radical; and X is a bond or divalent radical selected from the group consisting of $C_{1-10}$ alkylene radicals, $C_{2-8}$ alkenylene radicals, and $C_{6-8}$ cycloalkylene radicals.

4. The polymer alloy according to claim 3 wherein said polycarbonate is based on a diphenol selected from the group consisting of 4,4'dihydroxydiphenyl; 2,2-bis-(4-hydroxyphenyl) propane; 2,4-bis-(4-hydroxyphenyl)-2-methylbutane; 1,1-bis(4-hydroxyphenyl)-cyclohexane; $\beta,\beta$-bis-(4-hydroxyphenyl)-p-diisopropylbenzene; 2,2-bis-(3-chloro-4-hydroxyphenyl)propane; 2,2-bis-(3,5-dichloro-4-hydroxyphenyl) propane.

5. The polymer alloy according to claim 2, wherein in component (ii) (b) said vinyl aromatic monomer is selected from the group consisting of styrene, α-methyl styrene, and t-butyl styrene; said anhydride is maleic anhydride; and said $C_{1-4}$ alkyl or hydroxy alkyl acrylate or methacrylate is selected from the group consisting of methyl acrylate, ethyl acrylate, methyl methacrylate, and ethyl acrylate.

6. The polymer alloy according to claim 2, wherein in component (ii) (c) said $C_{1-4}$ alkyl acrylate or methacrylate is present in an amount from 100 to 70 weight % and said vinyl aromatic monomer is present in an amount from 0 to 30 weight %.

7. The polymer alloy according to claim 6, wherein said $C_{1-4}$ alkyl or hydroxy alkyl acrylate or methacrylate is selected from the group consisting of methyl acrylate, ethyl acrylate, methyl methacrylate and methyl methacrylate; and said vinyl aromatic monomer is selected from the group consisting of styrene, c-methyl styrene and t-butyl styrene.

8. The polymer alloy according to claim 2 wherein component (i) is a homopolymer of Formula I wherein n is 0 and one of $R_1$ or $R_2$ is a methyl radical and the other is a hydrogen atom.

9. The polymer alloy according to claim 2, wherein component (i) is a copolymer comprising from 0.1 to 40 mole percent of units of Formula I wherein n is an integer and from 99.9 to 60 mole percent of units of Formula II.

10. The polymer alloy according to claim 9, wherein component (i) is a copolymer comprising from 5 to 30 mole percent of units of Formula I wherein n is 1 and $R_1$ is an ethyl radical and $R_2$, $R_3$, and $R_4$ are hydrogen atoms and from 95 to 70 mole percent of units of Formula II.

* * * * *